(12) United States Patent  (10) Patent No.: US 9,358,713 B2
Olaru  (45) Date of Patent: Jun. 7, 2016

(54) INJECTION MOLDING APPARATUS WITH ACTIVE VALVE PIN DISENGAGEMENT

(71) Applicant: Otto Männer Innovation GmbH, Bahlingen am Kaiserstuhl (DE)

(72) Inventor: Gheorghe George Olaru, Freiburg (DE)

(73) Assignee: Otto Männer Innovation GmbH, Bahlingen am Kaiserstuhl (DE)

( * ) Notice: Subject to any disclaimer, the term of this patent is extended or adjusted under 35 U.S.C. 154(b) by 0 days.

(21) Appl. No.: 14/413,851

(22) PCT Filed: Jul. 12, 2013

(86) PCT No.: PCT/EP2013/002083
§ 371 (c)(1),
(2) Date: Jan. 9, 2015

(87) PCT Pub. No.: WO2014/009024
PCT Pub. Date: Jan. 16, 2014

(65) Prior Publication Data
US 2015/0151473 A1  Jun. 4, 2015

Related U.S. Application Data

(60) Provisional application No. 61/671,096, filed on Jul. 12, 2012.

(51) Int. Cl.
*B29C 45/22* (2006.01)
*B29C 45/80* (2006.01)
(Continued)

(52) U.S. Cl.
CPC ............... *B29C 45/80* (2013.01); *B29C 45/23* (2013.01); *B29C 45/232* (2013.01);
(Continued)

(58) Field of Classification Search
CPC ...................... B29C 45/281; B29C 2045/2813
See application file for complete search history.

(56) References Cited

U.S. PATENT DOCUMENTS 5,078,589 A  1/1992  Osuna-Diaz
7,210,922 B1  5/2007  Kohler
(Continued)

FOREIGN PATENT DOCUMENTS

DE  3245571 A1  6/1984
DE  603 00 133 T2  3/2005
(Continued)

OTHER PUBLICATIONS

International Search Report of PCT/EP2013/002083.
(Continued)

*Primary Examiner* — Jill Heitbrink
(74) *Attorney, Agent, or Firm* — Dienwiebel Transatlantic IP; Thomas Dienwiebel

(57) ABSTRACT

A hot runner injection molding apparatus (10) includes hot runner nozzles (20), a movable frame (30) that can be displaced between at least two positions relative to a plurality of mold cavities (24), each cavity having a mold gate (27). Valve pins (32) associated with the hot runner nozzles (20) are individually coupled to the movable frame (30) by a decouplable connector (36, 60). Disengagement devices (40) associated with the valve pins are activated to decouple any associated valve pin (32) from the movable frame (30). A control system (52) is used to activate the disengagement devices (40). In some instances a blocking element (42) is also activated to lock any valve pin at the mold gate or close to the mold gate. Control system (52) is further used to operate the blocking element (42). Disengagement devices (40) and the blocking elements (42) can be the same or different.

19 Claims, 8 Drawing Sheets

(51) Int. Cl.
*B29C 45/28* (2006.01)
*B29C 45/76* (2006.01)
*B29C 45/84* (2006.01)
*B29C 45/23* (2006.01)

(52) U.S. Cl.
CPC ............ *B29C 45/281* (2013.01); *B29C 45/768* (2013.01); *B29C 45/84* (2013.01); *B29C 2045/2813* (2013.01); *B29C 2045/2865* (2013.01); *B29C 2945/7604* (2013.01); *B29C 2945/76006* (2013.01); *B29C 2945/76016* (2013.01); *B29C 2945/76277* (2013.01); *B29C 2945/76287* (2013.01); *B29C 2945/76568* (2013.01)

(56) References Cited

U.S. PATENT DOCUMENTS

| | | | |
|---|---|---|---|
| 7,722,351 | B2 | 5/2010 | Feick et al. |
| 7,931,455 | B2 | 4/2011 | Tabassi |
| 7,988,445 | B2 | 8/2011 | Tabassi et al. |
| 8,100,689 | B2 | 1/2012 | Bouti et al. |
| 2009/0100962 | A1 | 4/2009 | Uracz et al. |
| 2009/0102099 | A1 | 4/2009 | Feick et al. |
| 2010/0047379 | A1 | 2/2010 | Selak et al. |
| 2010/0047383 | A1 | 2/2010 | Tabassi et al. |
| 2010/0092588 | A1* | 4/2010 | Tabassi ............... B29C 45/281 425/3 |
| 2010/0124579 | A1 | 5/2010 | Tabassi et al. |
| 2011/0018172 | A1 | 1/2011 | Bouti et al. |
| 2011/0086121 | A1 | 4/2011 | Bouti et al. |
| 2011/0304075 | A1 | 12/2011 | Catoen et al. |

FOREIGN PATENT DOCUMENTS

| | | |
|---|---|---|
| DE | 10 2009 053 503 A1 | 8/2010 |
| EP | 0480223 A1 | 4/1992 |
| EP | 1 336 464 B1 | 8/2003 |
| EP | 2156937 A1 | 2/2010 |
| KR | 101218920 B1 | 1/2013 |
| WO | 2006080807 A1 | 8/2006 |
| WO | 2012000924 A1 | 1/2012 |
| WO | 2012011139 A1 | 1/2012 |
| WO | 2012112732 A2 | 8/2012 |
| WO | 2013032622 A1 | 3/2013 |
| WO | 2013074741 A1 | 5/2013 |

OTHER PUBLICATIONS

E-Drive User Manual (Sep. 2010).
Translation of EP2156937.
Translation of WO2012000924.
Abstract of DE3245571.
Abstract of KR101218920.

* cited by examiner

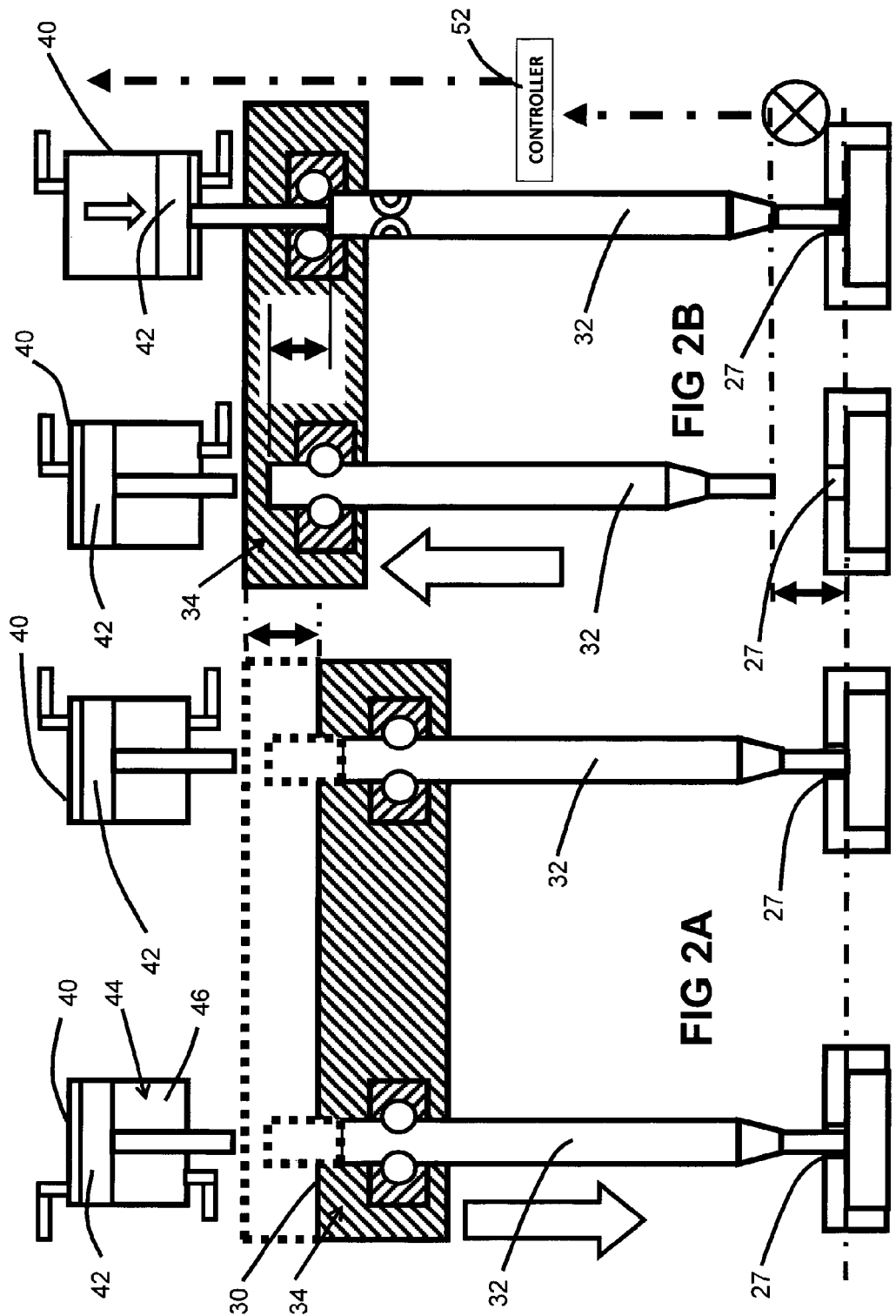

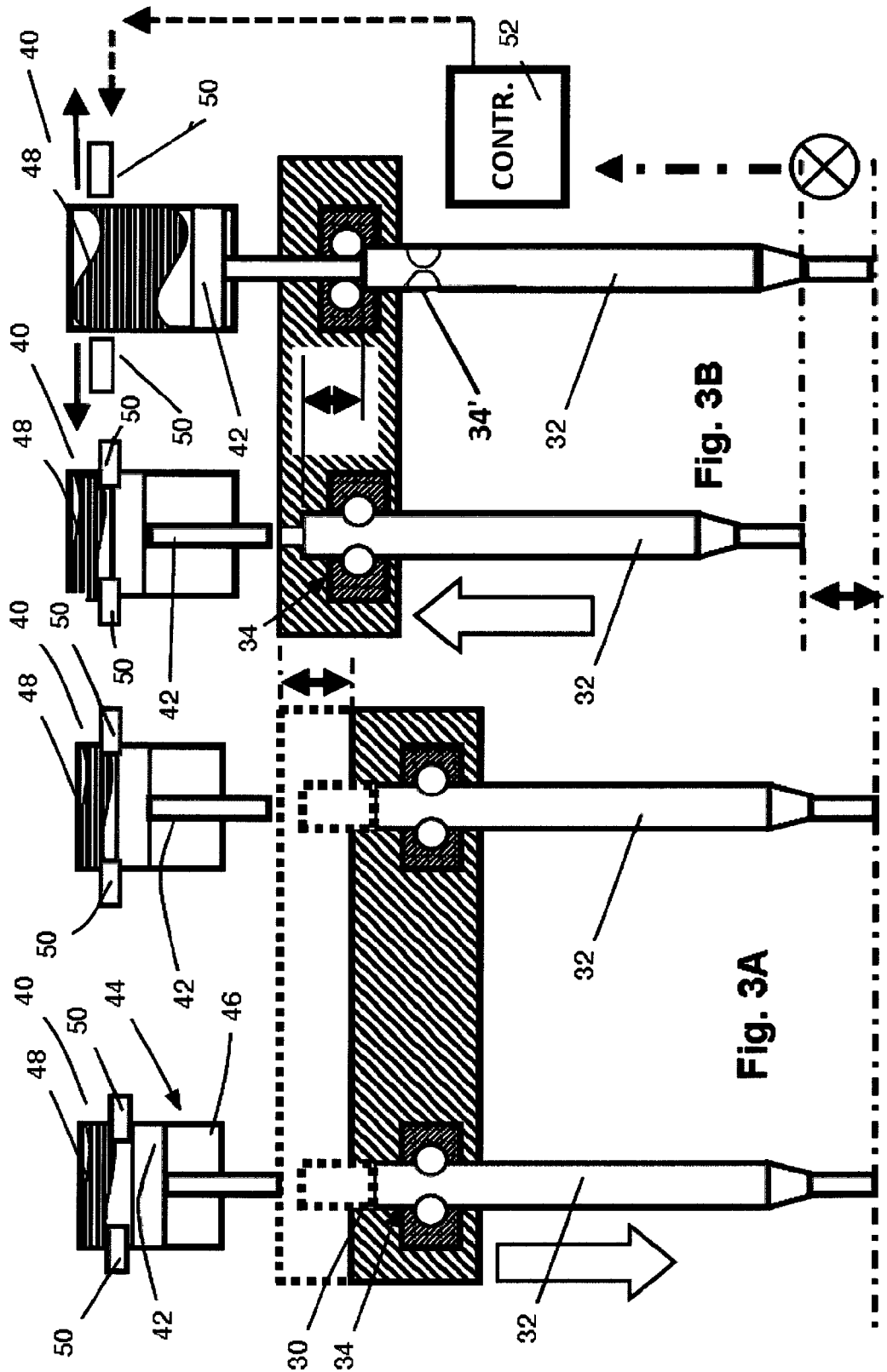

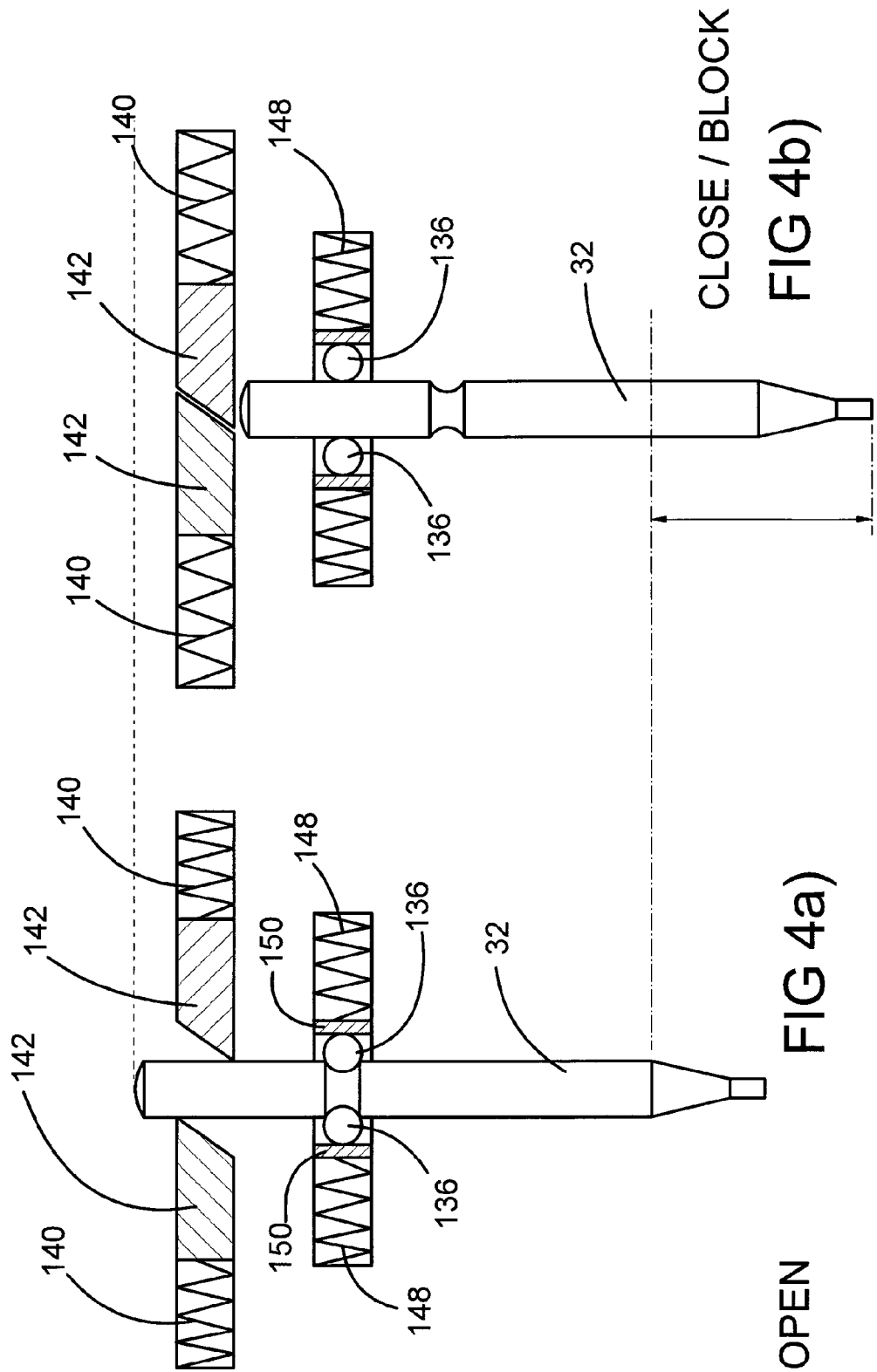

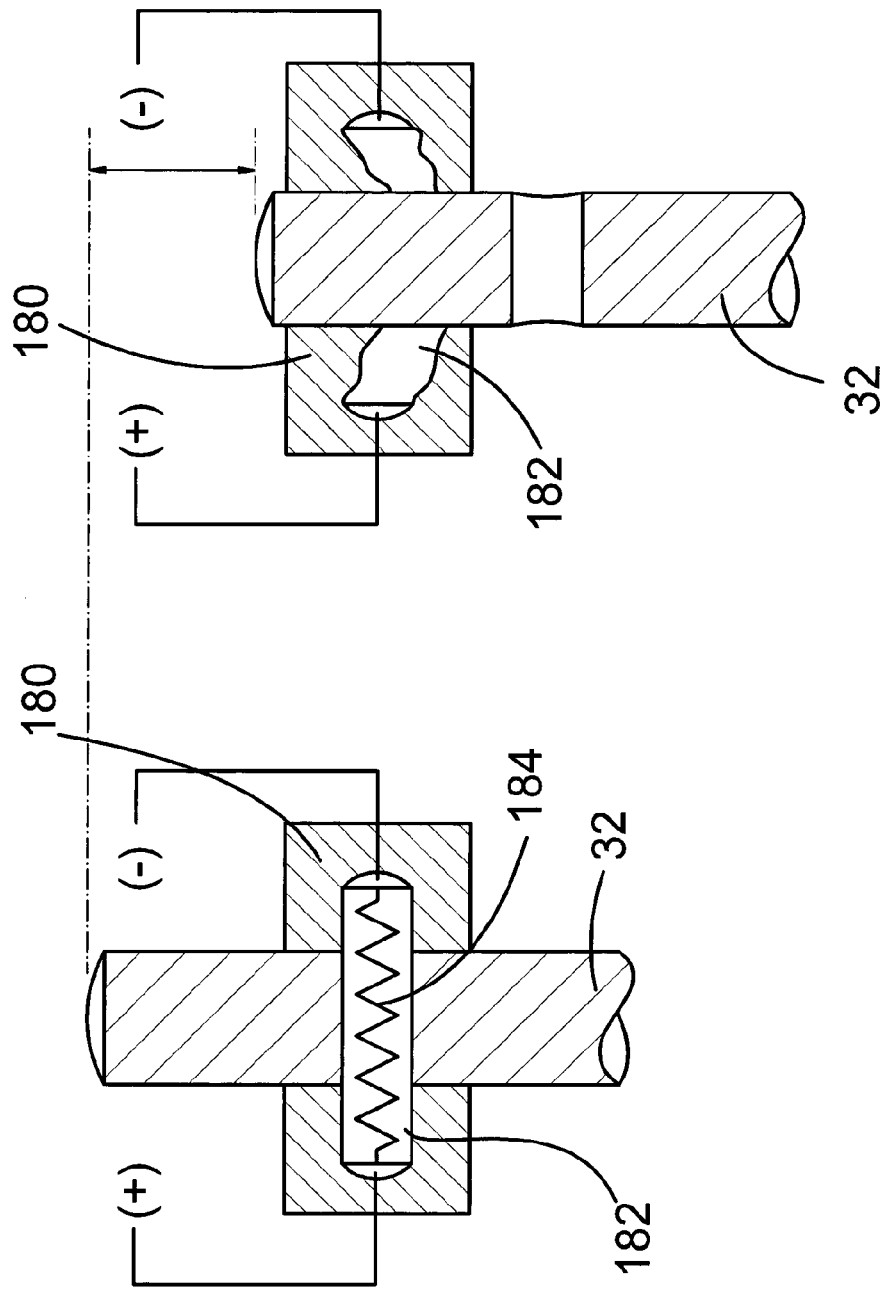

INJECTION MOLDING APPARATUS WITH ACTIVE VALVE PIN DISENGAGEMENT

CROSS-REFERENCE TO RELATED APPLICATIONS

This application claims the benefit of U.S. Provisional Patent Application No. 61/671,096, filed Jul. 12, 2012, the contents of which are incorporated herein by reference in their entirety.

FIELD

This disclosure relates to injection molding apparatuses and methods of injection molding. In particular this disclosure relates to hot runner apparatuses having valve pins movable by a plate driven by an actuator and methods of injection molding using these apparatuses.

BACKGROUND

Hot runner systems using valve pins connected to a movable common plate driven by an actuator are known. Reference is made in this regard to US 20090100962.

There is a need in several instances to disconnect or decouple one or several valve pins from the movable plate. Reference is made in this regard to U.S. Pat. No. 7,722,351 US 20110304075 U.S. Pat. No. 8,100,689 US 201100181.

There is a need in several instances to block one or several valve pins from moving away from one or several mold gates. Reference is made in this regard to U.S. Pat. No. 7,988,445.

The current state of the art, including the above recited patents have numerous limitations and drawbacks. The current state of the art uses reactive devices to decouple/disconnect/block the valve pins that operate only after a problem already exists.

There is a need to further improve and simplify the decoupling and blocking devices associated with valve gated hot runner systems using actuated plates.

There is a further need to prevent situations where the valve pins are not properly decoupled, too late decoupled or unnecessarily decoupled from the actuated plates.

There is a further need to prevent situations where the valve pins are not properly blocked, too late blocked or unnecessarily blocked from the actuated plates.

There is a further need to provide improved devices and methods to perform both functions of decoupling and blocking of selected valve pins at the same time.

SUMMARY

This invention relates to a hot runner injection molding apparatus where valve pins associated with the hot runner nozzles are individually coupled to a movable frame by a decouplable connector. Disengagement devices associated with the valve pins are activated to decouple any associated valve pin from the movable frame. A control system is used to activate the disengagement devices. Blocking elements can be in addition used in association with the valve pins to secure any valve pin in a locked position in the proximity of the gate. Control system is further used to activate the blocking elements. In some embodiments the disengagement devices and the blocking elements are the same. In some embodiments the disengagement devices and the blocking elements are different.

In one embodiment of the invention a hot runner injection molding apparatus includes hot runner nozzles, a movable frame that can be displaced between at least two positions relative to a plurality of mold cavities, each cavity having a mold gate. Valve pins associated with the hot runner nozzles are individually coupled to the movable frame by a decouplable connector. Disengagement devices associated with the valve pins are activated to decouple any associated valve pin from the movable frame. A control system is used to activate the disengagement devices.

In an embodiment of the invention a blocking element is further and in addition activated to lock any valve pin at the mold gate or close to the valve gate. The control system is further used to operate the blocking element.

Embodiments of the invention describe methods of injection molding using disengagement devices.

Embodiments of the invention describe methods of injection molding using blocking elements.

DESCRIPTION OF THE DRAWINGS

Reference is made, by way of example only, to the attached figures, wherein:

FIGS. 2a and 2b illustrate decoupling and blocking of valve pins from the apparatus shown in FIG. 1 using air or fluid actuated pistons;

FIGS. 3a, 3b and 3c illustrate decoupling and blocking of valve pins from the apparatus shown in FIG. 1 using spring actuated pistons;

FIG. 4a, 4b illustrate decoupling and blocking of valve pins from the apparatus shown in FIG. 1 using separate decoupling and blocking elements.

FIG. 6a, 6b illustrate decoupling of valve pins from the apparatus shown in FIG. 1 using a heater element.

DETAILED DESCRIPTION OF EXAMPLE EMBODIMENTS

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

Figure 1:
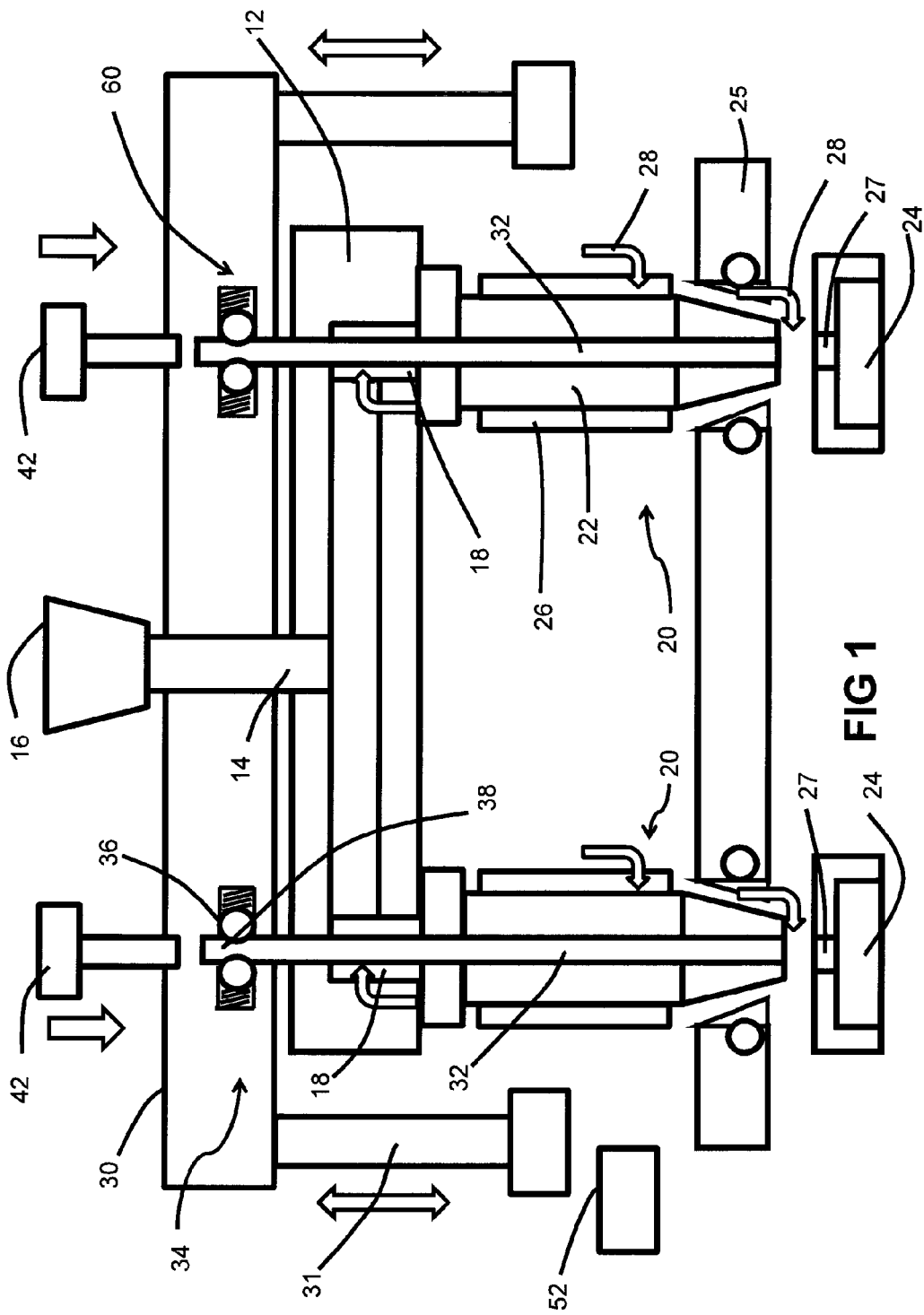
FIG. 1 is an elevation view of an injection molding apparatus in accordance with an embodiment of the invention.
Figure 1A:
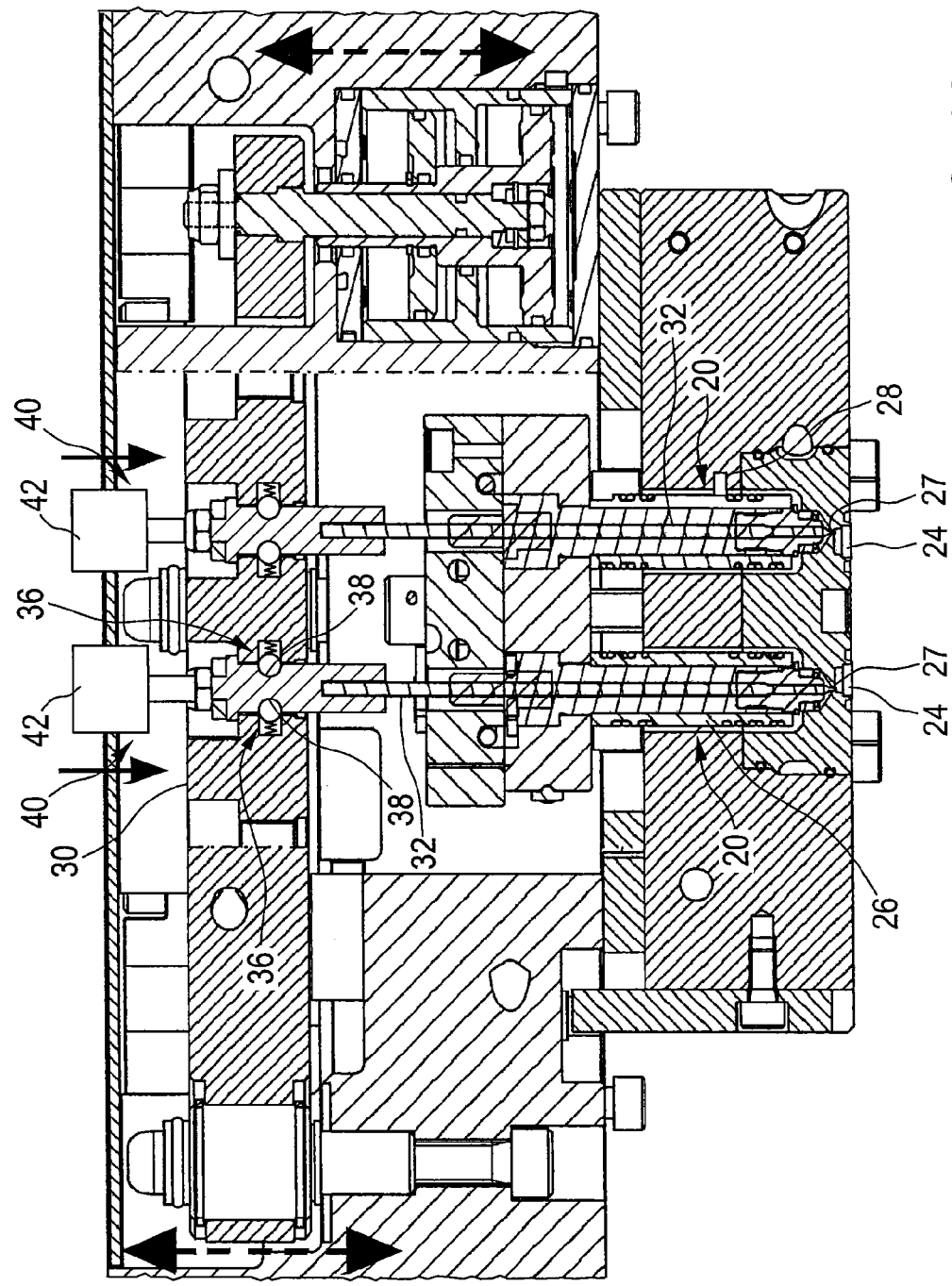
FIG. 1a is an elevation view of an injection molding apparatus in accordance with an embodiment of the invention.

Reference is made to FIG. 1, which shows a portion of a hot runner injection molding apparatus 10. The molding apparatus 10 includes an injection manifold 12 having an inlet melt channel 14 that receives molten material (e.g. resin) from an injection barrel 16, and a plurality of output melt channels 18 fluidically connected to and downstream from the inlet melt channel 14.

The molding apparatus 10 further includes a plurality of hot runner nozzles 20 associated with the manifold output melt channels 18. Each nozzle 20 includes a nozzle body 22 for transporting molten material from one of the output melt channels 18 to a mold cavity 24 in a mold plate 25. Each mold cavity 24 has a mold gate 27 associated therewith (and in some cases a plurality of mold gates are associated with each mold cavity 24). Each nozzle 20 further includes a nozzle heater 26 for heating molten material in the nozzle body 22 and optionally one or more thermocouples 28 for sensing temperatures associated with the molten material in the nozzle body 22 and temperatures associated with the nozzle body 22. The nozzle body 22 may be made from one or more components as is known in the art.

A movable plate or frame 30 is located on top of the manifold 12 and can be displaced by a frame driving mechanism 31 (e.g. hydraulically actuated rams) between at least two positions relative to the mold cavities 24, including a gate closed position shown in FIG. 2A and a gate open position shown in FIG. 2B.

A plurality of valve pins 32 are associated with the hot runner nozzles 20 (wherein each nozzle 20 has one valve pin 32 passing through it) and are displaced by the movable frame 30 between at least two positions relative to the mold gates 27 including a gate closed position and a gate open position, to control the amount of a molten material that is injected into each mold cavity 24 through the manifold and the hot runner nozzles 20.

Each valve pin 32 can be decoupled from movable frame 30 in case of an event. Also each valve pin 32 can be decoupled from movable frame 32 and also blocked relative the nozzle 20 and relative to the mold gate 27 when plate 32 is movable with selected valve pins 32. This relates to events when there is a need to decouple or to decouple and block a selected valve pin 32 or valve pins 32.

In some embodiments, the valve pin 32 when decoupled, remains stationary in the gate closed position regardless of the position of the movable frame 30 without the need for a blocking element 42.

Each valve pin 32 is independently held in place in the engaged position in the movable frame 30 by a valve pin capture mechanism 34 which may also be referred to as a decouplable connector. In the embodiments shown in some of the figures the capture mechanism 34 includes for example one or more ball plungers 36 which engage corresponding detents 38 in the associated valve pin 32. Other elements that can protrude in the valve pins and secure the valve pins to the movable frame 34 can be used as capture mechanisms.

A plurality of disengaging mechanisms 40 (FIGS. 1-1A-2A-3B), which may also be referred to as disengagement devices are provided in a separate plate (not shown) that is above the movable frame 30, wherein each disengaging mechanism 40 is operatively connectable to a valve pin 32 and is individually controllable to control the engagement of the valve pin 32 with the movable frame 30. Disengaging mechanisms made of elements 136-148-150 can also be coupled to the movable frame 34 as shown in FIGS. 4*a*) and 4*b*).

In the example embodiments shown in FIGS. 2A-3B, the disengagement devices 40 are operable to selectively drive the valve pin 32 from the engaged (coupled) position to the disengaged (decoupled) position. Each disengaging mechanism 40 includes a blocking element 42 movable from a passive position (shown on the left hand side of FIG. 2B) towards an active position (shown on the right hand side of FIG. 2B), where it prevents the movement of a valve pin 32 out of the gate closed position when the frame 30 is displaced from one position to the next relative to a corresponding mold gate 27.

It can be seen that the blocking element 42 is capable of abutting the valve pin 32 when driving the valve pin 32 to the disengaged position, but the blocking element 42 need not be fixedly connected to the valve 32.

Each disengaging mechanism 40 further includes a drive mechanism 44 for driving the blocking element 42 to the active position from the passive position. For example, in the embodiment shown in FIGS. 2A and 2B, the blocking element 42 is a piston that may seal against the side wall of a chamber 46 in which it travels and the drive mechanism 44 introduces a pressurized fluid (either a gas or a liquid) into one end of the chamber 46 to drive the piston towards the other end of the chamber 46.

Figure 3C:
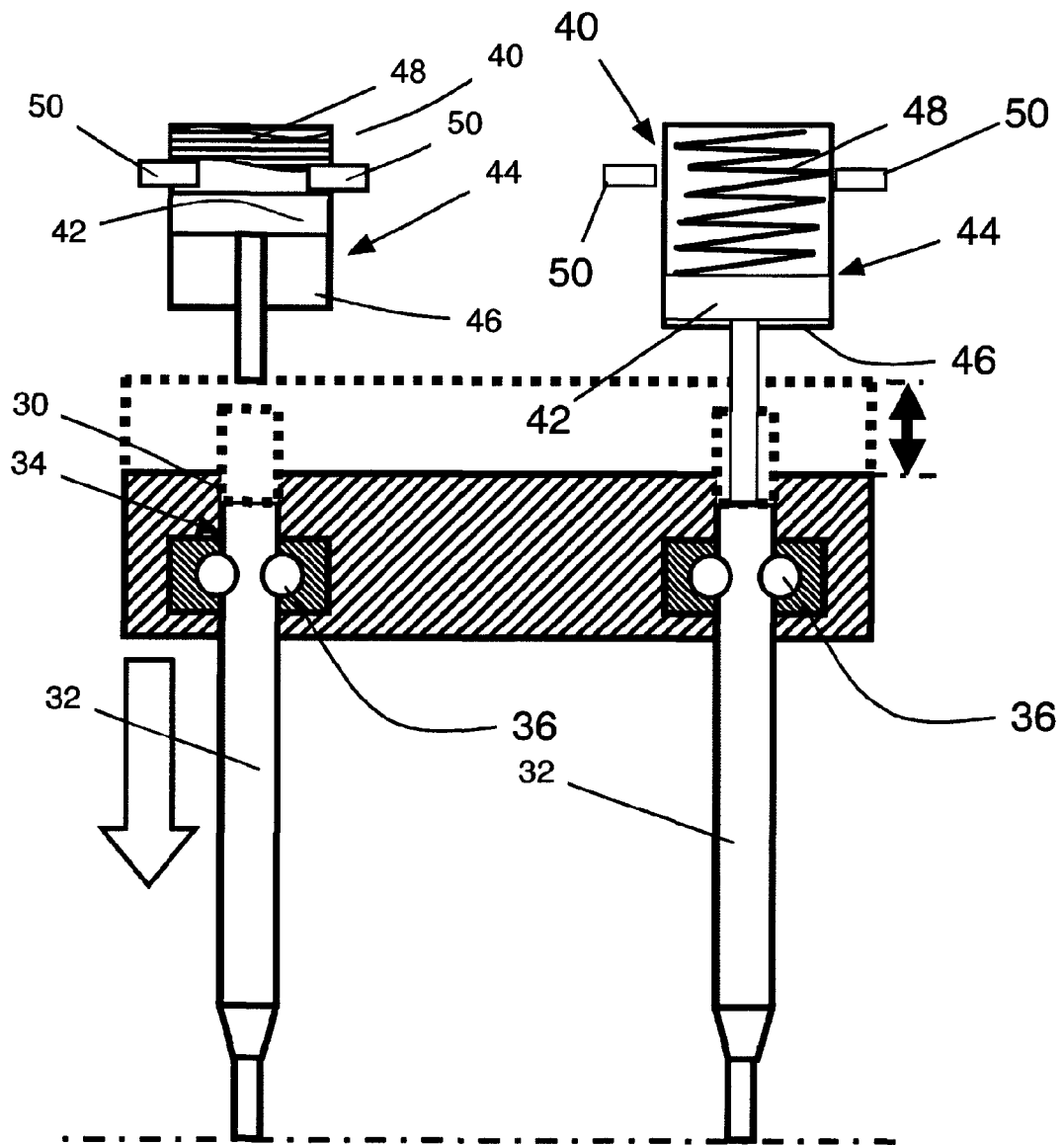
Figure 5:
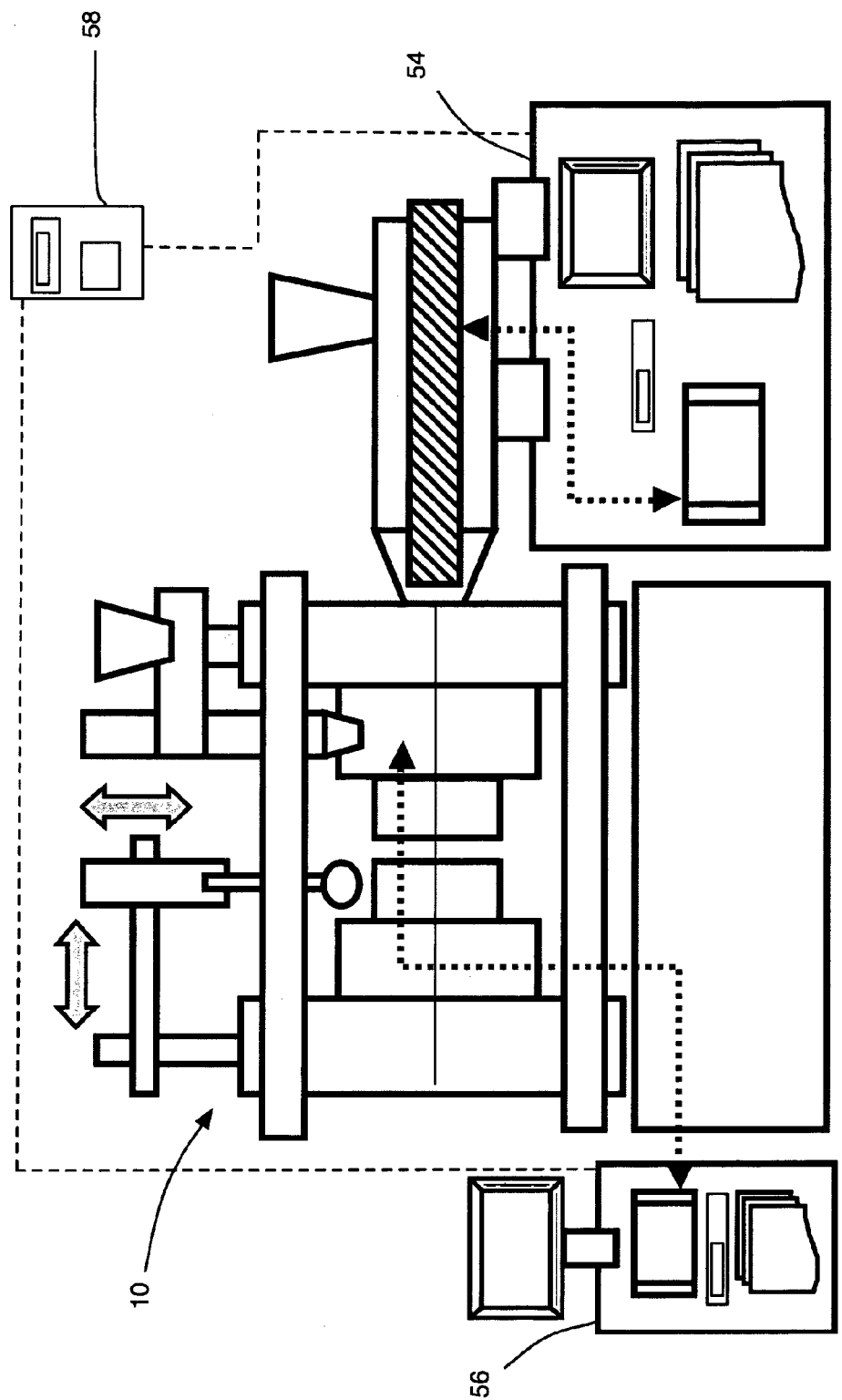
FIG. 5 is a schematic view of the injection molding apparatus including a plurality of controllers.

Alternatively, as shown in FIGS. 3*a* and 3*b*, the drive mechanism 44 may include a spring 48 and a spring retaining or blocking member 50 (e.g. a solenoid) that retains the spring 48 in a stored energy state (e.g. a compressed state). To drive the blocking element 42 to the active position, the spring retaining member 50 may be withdrawn (e.g. the solenoid may be retracted) thereby permitting the spring 48 to engage the blocking element 42 and drive it towards the active position.

The spring 48 may be referred to as by a piston biasing member. The disengagement mechanism 40 further includes a piston biasing member locking member (e.g. the spring retainer member 50) that is movable between a locking position wherein the piston biasing member locking member prevents the piston biasing member from driving the piston to the active position and a release position wherein the piston locking member permits the piston biasing member to drive the piston to the release position.

A control system 52 is provided to assist in controlling the operation of the molding apparatus 10. The control system 52 may include a single controller, or multiple controllers that communicate with each other as needed. The control system 52 is operatively connected to the disengaging mechanisms 40 and can selectively, individually drive each blocking element 42 to the active position. Thus the control system 52 can be used to control whether each valve pin 32 is engaged or disengaged with the movable frame 30. The control system 52 may be configured to permit an operator of the molding apparatus 10 to selectively disengage any selected valve pin 32 via an operator interface (not shown) that may contain, for example, a button (e.g. a virtual button on a touch screen, or a physical button on a panel) for each valve pin 32. For example, an operator may, upon inspection of a molded part, decide that the cosmetics of the part or other characteristics are negatively influenced by a certain valve pin 32 at a certain mold cavity 27 corresponding to the bad part. The operator may then deliver a command via the control system 52 to disengage that valve pin 32. It will be noted that the disengagement of the valve pin 32 can take place while the injection molding apparatus is in operation (i.e. during a molding cycle).

Additionally or alternatively, the control system 52 may receive signals from one or more sensors positioned to detect an operating parameter relating generally to each mold cavity 24 (e.g. the one or more sensors may be configured to collect processing data during the filling of each mold cavity 24). In an embodiment, the sensors are associated with the plurality disengaging mechanisms 40 and the processing data impacts directly or indirectly the movement of the valve pins 32 relative to the mold gates 27. The sensors may output signals to the disengaging mechanisms 40 where at least one blocking element 42 of at least one disengaging mechanism 40 is movable into an active position by the output signal from a sensor to prevent the movement of at least one valve pin 32 associated with that at least one disengaging mechanism 40 while other valve pins 32 are displaced by the frame 30 relative to the mold gates 27.

The control system 52, in some embodiments, may include an injection molding system controller 54, a hot runner apparatus controller 56 and optionally an external controller 58, such as an iPad or similar portable digital tablet computing device.

In some embodiments, the control system includes an interface that the control system 52 to be operable by an operator of the apparatus to decouple any selected valve pin from the movable frame.

In such embodiments, (or in embodiments that do not permit the operator to decouple valve pins via the control system 52), the control system 52 may control the decoupling of the valve pins based on the sensors. The plurality of sensors ( ) are positioned to transmit process data to the controller during the filling of each mold cavity ( ). The process data used by the control system 52 may include at least one type of data selected from the set of data consisting of: temperature, pressure, friction force, and stress. In some embodiments, the sensors provide this data. In particular, the sensors may be configured to sense at least one type of data selected from the set of data consisting of: temperature of melt in each nozzle, pressure of melt in each nozzle, friction exerted between melt and each nozzle, and stress in each nozzle from the flow of melt.

The sensors may also be capable of sending information to the control system 52 relating to the position of the valve pin. For example, in an embodiment wherein ball plungers are used to couple the valve pins 32 to the movable frame 30, switches may be provided that are actuated when the balls are retracted from the detents on the valve pins 32, thereby indicating that the valve pin 32 is decoupled from the frame 30, which is indicative that the valve pin 32 is in the gate closed position. Alternatively or additionally switches may be provided to signal when the blocking elements 42 reach the active and/or passive positions, also helping to indicate the position of the valve pin 32. In such embodiments, the control system may output information (e.g. to the operator) about the position of each valve pin 32.

In an embodiment, the sensors may include one or more of the thermocouples 28, and in particular thermocouples 28 that are positioned to detect the temperature of the molten material at each mold gate 27. If, for example, the control system 52 determines that the temperature of the molten material at a particular gate 27 is so cold that there is a risk that the associated valve pin 32 will be stuck, the control system 52 can actuate the associated disengaging mechanism 40 to drive the blocking element 42 to the active position thereby preventing the valve pin 32 from being withdrawn from the gate closed position when the movable frame 30 is retracted to the gate open position.

In some embodiments such as shown in FIGS. 4a) and 4b) the decoupling elements (136) and the blocking elements (142) are separate components and they are coupled to the movable frame 34. When the decoupling command from controller (52) is sent for example to pistons (42) similar to pistons 42 in FIGS. 2A and 2B, the pistons (42) may not block the valve pins (32) but just push them from engagement. In this case blocking elements (142) are pushed in a blocking position by springs (140) to slide over the pins 31 and block them. Elements 136 and 148 of FIGS. 4a and 4b are equivalent to elements 36 and 38 of FIG. 1. Elements 150 are small pistons.

In another embodiment similar to FIGS. 4a and 4b but not shown, heating elements (as shown in FIGS. 6a and 6b) can be connected to small pistons 150 and used to molten or deform balls 136. This provides a decoupling function based on a signal sent via controller 52 based on a sensor information or as requested by an operator. In this case blocking elements (142) are pushed in a blocking position by springs (140) to slide over the pins 31 and block them. In this case there is no need for pistons 42 to do either the decoupling function or the blocking function.

In some embodiments a heater element 184 shown in FIGS. 6a and 6b is provided as the decouplable connector. The heater element provides sufficient heat to a moltable connector 182 that couples the valve pins to the movable frame (32). The controller 52 provides the heating command to any individual heater element 184 and as a consequence the valve pins can be decoupled from the frame when needed. A blocking element can be further provided such as shown in FIG. 2a) and FIG. 4a)

In some embodiments an electromagnet not shown is provided as the decouplable connector. The electromagnet may be positioned on the movable frame, and is magnetically engageable with a magnetically attractive element (e.g. a permanent magnet, a ferro- or ferri-magnetic member or the like) on the valve pin 32. The control system 52 controls power to the electromagnet to control magnetic engagement of the electromagnet with the magnetically attractive element on the valve pin 32.

The control system 52 may include one or more controllers, as described above, however it may alternatively comprise a simple circuit for each valve pin 32, including a switch that is connected to a sensor, such as a thermocouple. When the temperature detected by the thermocouple falls below a selected value, the switch could close, providing power to the piston biasing member locking solenoids, thereby causing them to retract and permit the pistons 50 to be driven downwards (in the view shown in FIGS. 3a and 3b), so as to cause the blocking (and therefore disengagement) of the valve pins 32 from the movable frame 30.

It will be understood that, in some embodiments, the disengagement mechanisms may include actively controllable decouplable connectors (e.g. electromagnets not shown), and may optionally further include blocking members (e.g. members 50). While for certain situations blocking members may not be required (e.g. situations where the valve pin 32 is stuck in the gate closed position by solidified melt), in other situations blocking members may be advantageous (e.g. where the valve pin is damaged and may not be retained strongly by solidified melt. In other embodiments, the disengagement mechanisms include passive decouplable connectors (e.g. ball plungers) and blocking members (e.g. members 50).

In another aspect, a method of controlling the operation of the hot runner injection molding apparatus 10 including a plurality of hot runner nozzles 20 that communicate with a plurality of mold cavities 24 via a plurality of mold gates 27, comprising:
  a) carrying out a plurality of mold cycles in which
    i) a movable frame 30 holding a plurality of valve pins 32 is moved from a gate closed position in which the valve pins 32 block the mold gates 27 to prevent melt flow into the mold cavities, to a gate open position in which the valve pins 32 are retracted from the mold gates 27 to permit melt to enter the mold cavities 24,
    ii) melt is driven through the hot runner nozzles 20 into the plurality of mold cavities 24 after step i), and
    iii) the movable frame 30 is moved from the gate open position to the gate closed position after step ii);
  b) receiving processing data from a plurality of sensors 28 to a control system during step a); and
  c) disengaging at least one valve pin from the moveable frame and preventing retraction of at least one valve pin 32 from at least one mold gate 27 using the control system 52, based on the processing data received.

Step c) may further comprise blocking movement of the at least one valve pin 32 to prevent retraction of at least one valve pin 32 from at least one mold gate 27.

Step c) can in some embodiments be carried out manually by an operator of the injection molding apparatus via a user interface with the control system 52.

In some embodiments step c) is carried out automatically by the control system 52.

As stated in this disclosure and all the Figs, this invention discloses decoupling of valve pins 32 from a movable frame 30 in the event where the valve pins 32 are locked in nozzles 22 due to processing conditions where melt in the nozzle becomes too cold or too viscous.

A controller 52 provides a decoupling command based on information from sensors or from an operator.

An additional valve pins blocking device 40,140 can be further activated to secure the valve pins in a permanent stationary position. The controller 52 provides a command based on information from sensors or from an operator.

This invention further discloses decoupling and blocking of valve pins 32 from a movable frame 30 in the event where the valve pins 32 or the gate are damaged due to processing conditions such as excessive wear or when some cavities don't fill properly or some molded parts have defects. A controller 52 provides a decoupling command based on information from sensors or from an operator. A blocking device is in addition activated to secure the valve pins in a secure stationary position. The controller 52 provides a command based on information from visual inspection, sensors or from an operator.

The above-described embodiments are intended to be examples only, and alterations and modifications may be carried out to those embodiments by those of skill in the art.

The invention claimed is:

1. A hot runner injection molding apparatus comprising:
an injection manifold having an inlet melt channel and a plurality of output melt channels;
a plurality of hot runner nozzles associated with the manifold output melt channels;
a movable frame positioned proximate the manifold that can be displaced between at least two positions relative to a plurality of mold cavities, each cavity having a mold gate;
a plurality of valve pins associated with the hot runner nozzles, wherein each valve pin is couplable to the movable frame by a decouplable connector, wherein, when coupled to the movable frame the valve pins are displaceable by the movable frame between at least two positions relative to the mold gates to control the amount of a molten material injected into each mold cavity through the manifold and the hot runner nozzles;
a plurality of disengagement devices associated with the valve pins, wherein each disengaging device is operable to decouple an associated one of the valve pins from the movable frame, wherein each disengagement device includes a blocking element that is selectively movable from a passive position to an active position where the blocking element prevents the movement of one of the valve pins from a gate closed position when the movable frame is displaced from one position to another position, and
a control system that is operable to control the operation of the disengagement devices.

2. An injection molding apparatus as claimed in claim 1, wherein the control system is operable to carry out selective movement of each blocking element to the active position.

3. An injection molding apparatus as claimed in claim 1, wherein the control system is operable by an operator to decouple any selected valve pin from the movable frame.

4. An injection molding apparatus as claimed in claim 1, wherein the control system outputs information about the position of the valve pin.

5. An injection molding apparatus as claimed in claim 1, further comprising a plurality of sensors positioned to transmit process data to the controller during the filling of each mold cavity, wherein the control system controls the decoupling of each valve pin based on signals from the sensors.

6. An injection molding apparatus as claimed in claim 5, wherein the process data includes at least one type of data selected from the set of data consisting of: temperature, pressure, friction force, and stress.

7. An injection molding apparatus as claimed in claim 5, wherein the sensors are configured to sense at least one type of data selected from the set of data consisting of: temperature, pressure, friction force, and stress.

8. An injection molding apparatus as claimed in claim 5, wherein the sensors are configured to sense at least one type of data selected from the set of data consisting of: temperature of melt in each nozzle, pressure of melt in each nozzle, friction exerted between melt and each nozzle, and stress in each nozzle from the flow of melt.

9. An injection molding apparatus as claimed in claim 2, wherein the blocking element includes a fluid actuated piston.

10. An injection molding apparatus as claimed in claim 2, wherein the blocking element is a piston that is biased towards the active position by a piston biasing member, wherein the disengagement device further includes a piston biasing member locking member that is movable between a locking position wherein the piston locking member prevents the piston biasing member from driving the piston to the active position and a release position wherein the piston locking member permits the piston biasing member to drive the piston to the release position.

11. An injection molding apparatus as claimed in claim 1, wherein the piston biasing member locking member includes a solenoid.

12. An injection molding apparatus as claimed in claim 1, wherein the piston biasing member locking member includes a plurality of solenoids.

13. An injection molding apparatus as claimed in claim 1, wherein the decouplable connector includes a ball plunger that is positioned on one of the movable frame and an associated valve pin, and is engageable with a detent on the other of the movable frame and the associated valve pin.

14. An injection molding apparatus as claimed in claim 1, wherein the plurality of sensors includes image sensors.

15. An injection molding apparatus as claimed in claim 1, wherein the decouplable connectors include actuators that are movable by the control system between a retracted position in which the actuator is withdrawn from the associated valve pin, and an advanced position in which the actuator is advanced into locking engagement with the associated valve pin.

16. An injection molding apparatus as claimed in claim 15, wherein the actuators are linear solenoids.

17. An injection molding apparatus as claimed in claim 16, wherein each decouplable connector is an electromagnet on the movable frame, and which is magnetically engageable with a magnetically attractive element on the valve pin, wherein the control system controls power to the electromagnet to control magnetic engagement of the electromagnet with the magnetically attractive element on the valve pin.

18. A hot runner injection molding apparatus comprising:
an injection manifold having an inlet melt channel and a plurality of output melt channels;

a plurality of hot runner nozzles associated with the manifold output melt channels;

a movable frame positioned proximate the manifold that can be displaced between at least two positions relative to a plurality of mold cavities, each cavity having a mold gate;

a plurality of valve pins associated with the hot runner nozzles, wherein each valve pin is couplable to the movable frame by a decouplable connector, wherein, when coupled to the movable frame the valve pins are displaceable by the movable frame between at least two positions relative to the mold gates to control the amount of a molten material injected into each mold cavity through the manifold and the hot runner nozzles;

a plurality of disengagement devices associated with the valve pins, wherein each disengaging device is operable via an air piston to decouple an associated one of the valve pins from the movable frame and a control system that is operable to control the operation of the disengagement devices.

19. A hot runner injection molding apparatus comprising:

an injection manifold having an inlet melt channel and a plurality of output melt channels;

a plurality of hot runner nozzles associated with the manifold output melt channels;

a movable frame positioned proximate the manifold that can be displaced between at least two positions relative to a plurality of mold cavities, each cavity having a mold gate;

a plurality of valve pins associated with the hot runner nozzles, wherein each valve pin is couplable to the movable frame by a decouplable connector, wherein, when coupled to the movable frame the valve pins are displaceable by the movable frame between at least two positions relative to the mold gates to control the amount of a molten material injected into each mold cavity through the manifold and the hot runner nozzles;

a plurality of disengagement devices associated with the valve pins, wherein each disengaging device is operable to decouple an associated one of the valve pins from the movable frame by a pushing the valve pin towards the mold gate, and a control system that is operable to control the operation of the disengagement devices.

* * * * *